(12) United States Patent
Spriestersbach et al.

(10) Patent No.: US 7,329,828 B2
(45) Date of Patent: Feb. 12, 2008

(54) METHOD FOR INERT GAS WELDING OR INERT GAS SOLDERING OF WORKPIECES COMPRISING IDENTICAL OR DIFFERENT METALS OR METAL ALLOYS BY MEANS OF AN ADDITIONAL ZN/AL METAL

(75) Inventors: Jochen Spriestersbach, Duisburg (DE); Jurgen Wisniewski, Wesel (DE); Frank Prenger, Ratingen (DE)

(73) Assignee: Grillo-Werke AG, Duisberg (DE)

( * ) Notice: Subject to any disclaimer, the term of this patent is extended or adjusted under 35 U.S.C. 154(b) by 0 days.

(21) Appl. No.: 10/549,880

(22) PCT Filed: Mar. 10, 2004

(86) PCT No.: PCT/EP2004/050284

§ 371 (c)(1),
(2), (4) Date: Jul. 10, 2006

(87) PCT Pub. No.: WO2004/087366

PCT Pub. Date: Oct. 14, 2004

(65) Prior Publication Data
US 2006/0272749 A1    Dec. 7, 2006

(30) Foreign Application Priority Data
Mar. 29, 2003    (EP) .................... 03007198

(51) Int. Cl.
*B23K 10/00* (2006.01)
(52) U.S. Cl. .................... 219/121.46; 219/121.59; 219/76.16; 219/76.15
(58) Field of Classification Search ........... 219/121.43, 219/121.46, 121.59, 121.54, 121.48, 121.49, 219/76.15, 76.16
See application file for complete search history.

(56) References Cited

U.S. PATENT DOCUMENTS

| 6,198,068 B1 * | 3/2001 | Lindstrom ............ 219/121.46 |
| 6,457,632 B1 * | 10/2002 | Teshima et al. ............ 228/246 |
| 6,840,434 B2 * | 1/2005 | Clay et al. ................... 228/223 |
| 2003/0196307 A1 * | 10/2003 | Chen et al. ................. 29/421.1 |
| 2005/0109822 A1 * | 5/2005 | Pan et al. ................... 228/226 |

FOREIGN PATENT DOCUMENTS

| DE | 198 49 510 A1 | 5/2000 |
| DE | 100 57 180 A1 | 8/2001 |
| EP | 0 498 154 A1 | 1/1992 |
| EP | 1 195 219 A3 | 9/2001 |
| FR | 2 815 562 | 4/2002 |

* cited by examiner

Primary Examiner—Mark Paschall
(74) Attorney, Agent, or Firm—Knobbe, Martens, Olson & Bear, LLP

(57) ABSTRACT

The invention relates to a method for inert gas welding or inert gas soldering of workpieces (A) made of steel, aluminum, magnesium, copper, or the alloys thereof with workpieces (B) made of steel, aluminum, magnesium, copper, or the alloys thereof by using an additional molten metal alloy, workpieces (A) and (B) being made of identical or different metals or metal alloys. The inventive method is characterized by the following steps: a) the workpieces that are to be connected are contacted edge to edge or in an overlapping manner; b) the additional metal alloy containing a Zn/Al alloy is fused; c) the additional molten metal alloy is applied to the contact points or partial areas of the contact points of the contacted workpieces; d) the connected workpieces are cooled. Steps b) and c) are carried out immediately after one another while at least steps b) and c) are carried out by using an inert gas. The invention further relates to a wire that is used in said method.

9 Claims, No Drawings

METHOD FOR INERT GAS WELDING OR INERT GAS SOLDERING OF WORKPIECES COMPRISING IDENTICAL OR DIFFERENT METALS OR METAL ALLOYS BY MEANS OF AN ADDITIONAL ZN/AL METAL

RELATED APPLICATIONS

This application is a U.S. National Phase of International Application No.: PCT/EP2004/050284 filed Mar. 10, 2004, designating the U.S. and published in German on Oct. 14, 2004 as WO 2004/087366, which claims the benefit of European Patent application No.: 03007198.9 filed Mar. 29, 2003.

FIELD OF THE INVENTION

The invention relates to a method for inert gas welding or inert gas soldering of workpieces made of identical or different metals or metal alloys, using an additional Zn base metal alloy. Workpieces made of steel, magnesium, aluminum, copper and alloys thereof are welded or soldered, and the workpieces to be joined may consist of identical or different metals or metal alloys. The invention further relates to a wire that is used in said method.

DESCRIPTION OF THE RELATED ART

In the motor manufacturing industry and particularly in car manufacture, the use of a variety of light metal components in bodywork construction has become common practice in order to reduce the overall weight of the bodywork, which has a positive effect on the overall fuel consumption. Frequently, components made of aluminum, aluminum alloys or magnesium alloys are used in this context. In fact, vehicles are now being marketed wherein these materials constitute much more than half of the bodywork thereof.

The change of materials used in bodywork construction has also necessitated a corresponding adaptation of the prior art joining processes. While earlier bodywork construction essentially required sheet steel joining, it has now become necessary to provide joints between different materials in a way so as to allow use thereof in an industrial production process without major complications.

To join sheet steel, such as galvanized thin sheet metal frequently used in bodywork construction, the prior art uses inert gas welding or inert gas soldering, among other things. Such methods have been described in DIN 1910-2.

Metal inert gas welding is a method wherein a workpiece in the area to be welded is melted by means of an arc burning between a wire electrode in a flow of inert gas and the workpiece. The wire electrode may include welding additives and has to be adjusted to the material to be welded. In this way, the workpiece areas to be welded are joined with each other.

Using the above methods, steel as well as nonferrous metals are welded together.

An alternative method is metal inert gas soldering which differs from metal inert gas welding merely by the fact that a solder melting lower than the base materials to be joined is used as wire electrode, so that the entire process can be carried out at lower temperatures.

This method, also referred to as "MIG soldering", has gained acceptance particularly in joining galvanized thin sheet metal in the automobile industry. Compared to the corresponding welding methods, it offers the advantage of higher process safety, improved quality of the soldering seams, and high joint strength, as well as high corrosion resistance of the joined metal parts. In this method, argon or a gas containing argon can be used as inert gas for welding. These gas mixtures include active gases capable of generating smoother soldering seams and good seam transitions to the base material. To this end, a mixture of argon with minor amounts of oxygen is used, for example.

Brazing solders or high-temperature solders such as copper base wires are employed as solder. Essentially, they consist of copper including various alloying elements such as silicon, aluminum, tin, nickel, zinc and manganese. The melting point of the solders is about 950 to 1400° C., and this is the region where such soldering is performed. Compared to the welding method, the soldering method also has the advantage that the thermal load on the component parts is considerably lower, and that the zinc layer of the galvanized thin sheet metal is not changed by the welding temperatures to such an extent that the corrosion resistance would be deteriorated.

The invention described below is intended to provide an improvement of the welding or soldering method so as to allow similar joining of materials with each other and of different metals and metal alloys, especially those made of steel, aluminum, magnesium, copper or alloys thereof. Joining such materials by means of inert gas welding or inert gas soldering using zinc base solders has not been described as yet.

However, other methods of joining steel and aluminum are known from the prior art. Thus, DE 100 57 180 A1 describes a method of joining steel tubes and aluminum ribs. Therein, a zinc-aluminum alloy having an aluminum content of 0.5 to 20 wt.-% is used as solder. The joining method is effected in such a way that the solder layer initially is applied on the steel tubes or aluminum ribs using a flame-spray method or an arc method. It is only after that when the aluminum ribs are contacted with the steel tubes and a fluxing agent in the form of cesium aluminum tetrafluoride is applied. Thereafter, the steel tubes provided with the aluminum ribs are soldered in an oven at a temperature between 370 and 470° C. The above method is a method comprising two process steps. In the first step, the solder is applied on the individual components. Subsequently, the solder undergoes cooling. In a second process step, the components are contacted, the fluxing agent is applied at room temperature, and the components are soldered in an oven. Obviously, such a method, especially in bodywork construction, cannot be performed in the form of an industrial continuous process.

The technical object of the invention was therefore to modify the inert gas welding method or inert gas soldering method known from the prior art such that, in addition to joining identical metals, the method would also be suitable in joining different metals, particularly of steel, aluminum, magnesium, copper or alloys thereof.

SUMMARY OF THE INVENTION

The above technical object is accomplished by means of a method for inert gas welding or inert gas soldering of workpieces (A) made of steel, aluminum, magnesium, copper or alloys thereof with workpieces (B) made of steel, aluminum, magnesium, copper or alloys thereof, using an additional molten metal alloy, wherein said workpieces (A) and (B) may consist of identical or different metals or metal alloys, characterized by the following steps: a method of joining workpieces made of steel with workpieces made of other metallic materials, using an additional metal alloy, characterized by the following steps:
  a) abutting or overlapping contacting of the workpieces to be joined;
  b) melting the additional metal alloy containing a Zn/Al alloy;
  c) applying the molten additional metal alloy on the contact surfaces or partial areas of the contact surfaces of the contacted workpieces;
  d) cooling the joined workpieces;
  steps b) and c) being carried out one immediately after the other, with at least steps b) and c) being carried out using an inert gas.

DETAILED DESCRIPTION OF THE PREFERRED EMBODIMENT

Considered as inert gases in the meaning of the invention are those gases or mixtures of gases which do not undergo any reaction with the additional metal alloy or with the material of the workpieces during the process. In a preferred fashion, noble gases are used to this end, especially argon. On the other hand, it is also possible to use mixtures of gases comprising inert gases together with active gases having an effect on the process or on alloy formation. For example, these include mixtures of gases comprising argon and minor amounts of oxygen or carbon dioxide.

By employing said zinc base alloys as additional metal alloy and using an inert gas, workpieces made of different metallic materials can be joined in a single-step process which can also be performed in a continuous and automated fashion. Owing to the lower melting temperature of said zinc base alloy, ranging from 350 to 450° C., the entire process can be carried out at lower temperatures compared to previous inert gas soldering methods, being performed at about 1000° C. As a result, there is substantially less distortion of component parts because operations are possible at lower temperature in total. In particular, this also permits joining of very thin materials such as bands or sheet metals having a thickness of less than 1 mm. Furthermore, the lower temperature saves a considerable expense of energy in favor of the soldering process. Another advantage is that steel components, if used in the form of galvanized sheet steel, would not be damaged in their zinc coat owing to the lower temperature, that corrosion protection in the area of the welding seam or soldering seam is retained, so that laborious secondary operations to maintain corrosion protection are not necessary.

Zinc has a melting point of 419° C. and a boiling point of 908° C. Consequently, at soldering temperatures in a range of 1000° C., a major amount of the zinc coating of the sheet steel will evaporate. On the one hand, this interferes with the joining process and the strength of the joint and, on the other hand, results in a reduction of the corrosion resistance of the sheet steel, which is to be achieved by said zinc coating and will be destroyed during the joining process. By virtue of the method according to the invention, joining is effected at substantially lower temperatures, so that the above problem is avoided.

Furthermore, the soldering joint thus produced was found to have high strength and good corrosion resistance.

In a preferred embodiment, the method uses workpieces made of steel comprising galvanized or non-galvanized steel. Today, fine and galvanized thin sheet metals intended to prolong the lifetime of vehicles are frequently used in the motor manufacturing industry. The average percentage of such sheet metals in bodywork construction is more than 70% today. As a consequence, most of the motor manufacturers meanwhile grant anti-rust guarantee periods of up to 12 years.

In a preferred embodiment the metallic materials consist of steel, aluminum, aluminum alloys, magnesium, magnesium alloys, copper and copper alloys. Particularly preferred are aluminum and aluminum alloys and aluminum-magnesium alloys frequently being used in the motor manufacturing industry today. They have good mechanical properties and, owing to their low specific weight, result in a reduction of the bodywork overall weight and thus in a reduction of fuel consumption. In a particularly preferred embodiment, materials made of steel, especially galvanized steel, are envisaged for joining with materials made of aluminum, aluminum alloys, magnesium, magnesium alloys. To this end, a zinc base alloy with aluminum is preferably used.

In a particularly preferred embodiment the workpieces are joined using the inert gas welding/soldering method.

The above method is a method wherein a solder is melted by means of an arc or a plasma or a laser, and the liquid solder is applied on the spots to be welded/soldered. Such methods are known as arc welding methods, plasma welding methods or WIG welding methods, and the method according to the invention involves the special feature that this method is performed using a zinc base solder.

Particularly preferred is the arc welding/soldering method. The arc is burning between a wire electrode and the workpiece. The wire electrode is surrounded by an inert gas nozzle from which inert gas is passed to the spot to be joined. The wire electrode consists of said additional metal alloy, thus representing the solder by means of which the workpiece is connected. This method allows continuous joining of metallic materials in a single-step continuous process. Melting of the additional metal alloy is preferably effected using an electric arc burning between the wire electrode and the workpiece. When joining steel and light metals such as aluminum or magnesium and alloys thereof, the light metals are partially melted in the method according to the invention. Furthermore, a solder is used, so that this method is a combined welding-soldering method.

The method of the invention can be performed with or without fluxing agents. In general, a fluxing agent is used to facilitate melting of the solder during soldering, promote deposition of particular substances, or prevent oxidation. Especially in the case of aluminum, a fluxing agent is normally used in order to remove the interfering oxide layer. However, the use of fluxing agents is disadvantageous in that most fluxing agents are highly aggressive, causing corrosion of aluminum after joining with other metals. Additional steps are therefore required to remove the fluxing agents following thermal joining. Surprisingly, it has been found that the method of the invention can be performed without using any fluxing agents, and that high-strength and durable joints between the materials to be joined can nevertheless be produced. This is all the more astonishing as it is precisely such joining of different metals, e.g. made of alloys of steel, aluminum or magnesium, where extremely brittle intermetallic phases may be formed, giving rise to inadequate strength of the joint. Obviously, it is precisely that substantially lower temperature required in the method of the invention which avoids formation of said intermetallic phases, thereby achieving a joint higher in strength.

As additional metal alloys, those zinc base alloys are preferably used which, in addition to normal impurities, include from 1 to 25 wt.-% aluminum. Particularly preferred are zinc alloys including from 5 to 15 wt.-% aluminum, and most preferred are those including 4 wt.-% aluminum. More specifically, the following zinc alloys can be employed: $ZnAl_5$, $ZnAl_{15}$, $ZnAl_2$, $ZnAl_{20}$, $ZnAl_{22}$ and $ZnAl_4$.

In addition to normal impurities, said zinc base alloy may include one or more alloying additives, particularly up to 500 ppm Mg, up to 500 ppm Cr, up to 2000 ppm Mn, up to 300 ppm Li, up to 4% Cu, up to 50 ppm B, up to 500 ppm Ti, and up to 1000 ppm Si.

In the method according to the invention, the additional metal alloy is employed in the form of a solid wire or cored wire. If a cored wire is used, the core of such a cored wire may include appropriate additives required for soldering. For example, additives can be fluxing agents (e.g. based on Cs), metal powders selected from the group comprising aluminum, chromium, titanium, manganese and nickel.

In a preferred fashion the method of the invention is performed in such a way that the wire electrode made of zinc base alloy, surrounded by a flow of inert gas, is melted in an arc, plasma or laser, and the molten additional metal alloy is applied on the corresponding contact surfaces or partial areas of the contact surfaces of the contacted workpieces. This is done immediately after melting the additional metal alloy.

The invention is also directed to a wire 0.8 to 3.2 mm in diameter for use in a method for inert gas welding or inert gas soldering of workpieces A made of steel, aluminum, magnesium, copper or alloys thereof with workpieces B made of steel, aluminum, magnesium, copper or alloys thereof, wherein workpieces A and B may consist of identical or different metals or metal alloys, using a molten additional metal alloy consisting of a zinc base alloy including an Al content of from 1 to 25 wt.-%.

In another preferred embodiment the zinc-aluminum alloy may include one or more of the following alloying additives as single components or in combination: up to 500 ppm Mg, up to 500 ppm Cr, up to 2000 ppm Mn, up to 300 ppm Li, up to 4% Cu, up to 50 ppm B, up to 500 ppm Ti, and up to 1000 ppm Si. In a preferred fashion the wire can be a solid wire or a cored wire.

The invention will be explained in more detail with reference to the following examples.

EXAMPLES

Tests were performed to produce soldered joints of galvanized steel parts with each other and of galvanized steel parts with aluminum parts using inert gas welding and zinc-aluminum solders. Welding units from various manufacturers were used.

Galvanized steel parts 0.7 to 2 mm in thickness and aluminum parts 0.8 to 2.5 mm in thickness were used as base materials. A $ZnAl_4$ solder wire in the form of a solid wire and 1.6 mm in diameter was used as solder material. Argon was used as inert gas. Overlapping joints and abutting joints were produced between the steel parts and between the steel parts and aluminum parts.

The setting angle was 45 to 80° and the inclination of the torch (electric arc at torch) was 60 to 90°. The spacing between the torch and the workpieces to be joined was 10 to 25 mm at the inert gas nozzle, and the path feed rate during soldering was 0.3 to 1.3 m/min.

It was found that when using the above parameters, it is possible to produce reproducible joints between steel parts alone and between steel parts and aluminum parts with even welding/soldering seam formation. Subsequent investigation of the mechanical-technological properties showed that breaking in aluminum material in through-soldered samples in a tensile test is outside the heat-affected zone ($R_m \geq 205$ MPa).

This demonstrates that when using the method according to the invention, it is possible to produce e.g. firm and corrosion-resistant joints between materials made of steel and materials made of aluminum.

What is claimed is:

1. A method for inert gas welding or inert gas soldering of workpieces (A) made of steel, aluminum, magnesium, copper or alloys thereof with workpieces (B) made of steel, aluminum, magnesium, copper or alloys thereof, using an additional molten metal alloy, wherein said workpieces (A) and (B) consist of identical or different metals or metal alloys, said method comprising:
   a) abutting or overlapping contacting of the workpieces to be joined;
   b) melting the additional metal alloy containing a Zn base alloy with an electric arc;
   c) applying the molten additional metal alloy on the contact surfaces or partial areas of the contact surfaces of the contacted workpieces;
   d) cooling the joined workpieces;
   steps b) and c) being carried out one immediately after the other, with at least steps b) and c) being carried out using an inert gas, wherein the workpieces are joined using additional metal alloys, the melting temperatures of which ranging from 370 to 600° C.

2. The method according to claim 1, wherein the workpieces of steel consist of galvanized or non-galvanized steel.

3. The method according to claim 1, wherein the workpieces are joined with or without the use of a fluxing agent.

4. The method according to claim 1, wherein the Zn base alloy includes from 1 to 25 wt.-% Al.

5. The method according to claim 4, wherein the Zn/Al alloy includes one or more of the following alloying additives as single components or in combination: up to 500 ppm Mg, up to 500 ppm Cr, up to 2000 ppm Mn, up to 300 ppm Li, up to 4% Cu, up to 50 ppm B, up to 500 ppm Ti, and up to 1000 ppm Si.

6. The method according to claim 1, wherein the additional metal alloy is employed in the form of a solid wire or cored wire.

7. The method of claim 1, wherein said molten additional metal alloy consists of a zinc base alloy including an Al content of from 1 to 25 wt.-%, said additional metal alloy is in the form of a wire having a diameter of from 0.8 to 3.2 mm.

8. The method according to claim 7, wherein the Zn/Al alloy includes one or more of the following alloying additives as single components or in combination: up to 500 ppm Mg, up to 500 ppm Cr, up to 2000 ppm Mn, up to 300 ppm Li, up to 4% Cu, up to 50 ppm B, up to 500 ppm Ti, and up to 1000 ppm Si.

9. The method according to claim 7, wherein said wire is a solid wire or a cored wire.

* * * * *

UNITED STATES PATENT AND TRADEMARK OFFICE
CERTIFICATE OF CORRECTION

| | | |
|---|---|---|
| PATENT NO. | : 7,329,828 B2 | Page 1 of 1 |
| APPLICATION NO. | : 10/549880 | |
| DATED | : February 12, 2008 | |
| INVENTOR(S) | : Spriestersbach et al. | |

It is certified that error appears in the above-identified patent and that said Letters Patent is hereby corrected as shown below:

On the Title page, line 11 (item 73), please delete "Duisberg" and insert --Duisburg-- therefor.

Signed and Sealed this

Eighteenth Day of November, 2008

JON W. DUDAS
*Director of the United States Patent and Trademark Office*